Aug. 6, 1968     A. L. JACKSON     3,395,795
TABLE SILVER ASSORTING MACHINE
Filed July 13, 1966     5 Sheets-Sheet 1
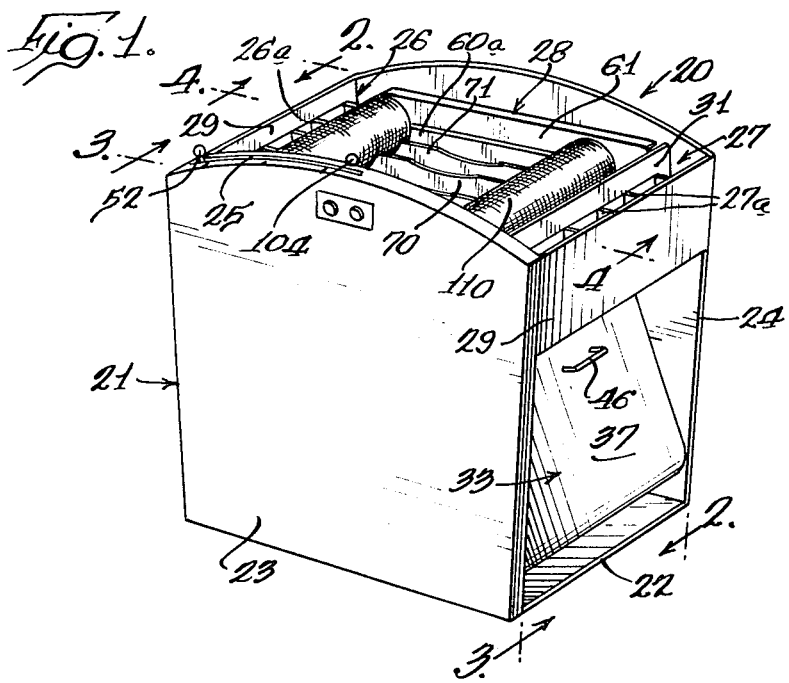
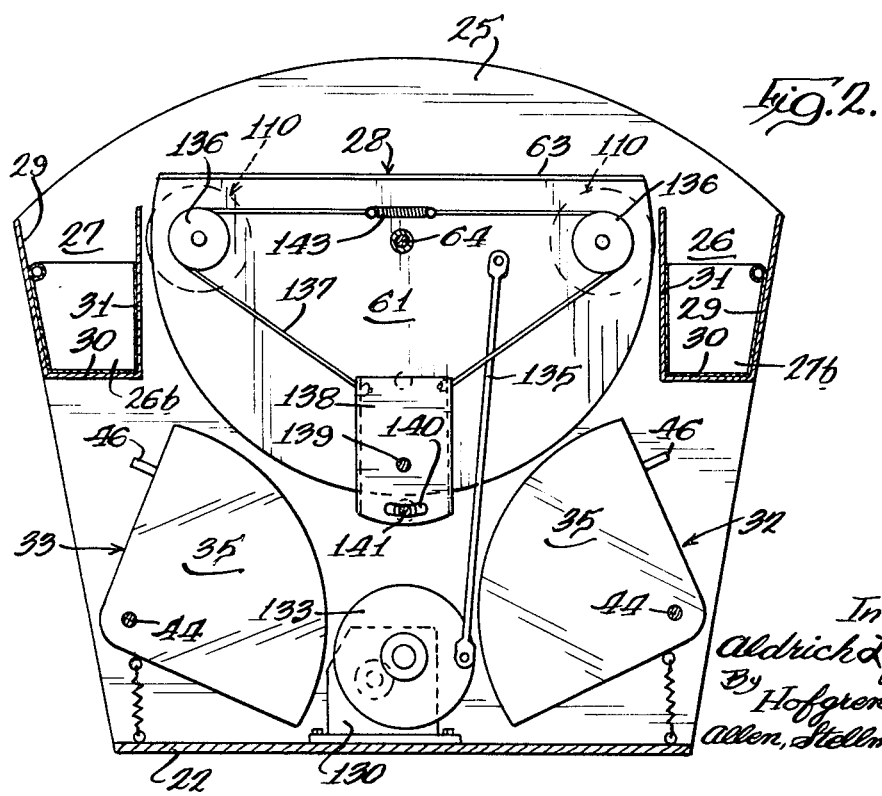
Inventor:
Aldrich L. Jackson
By Hofgren, Wegner,
Allen, Stellman & McCord
Att'ys Aug. 6, 1968  A. L. JACKSON  3,395,795
TABLE SILVER ASSORTING MACHINE
Filed July 13, 1966  5 Sheets-Sheet 2
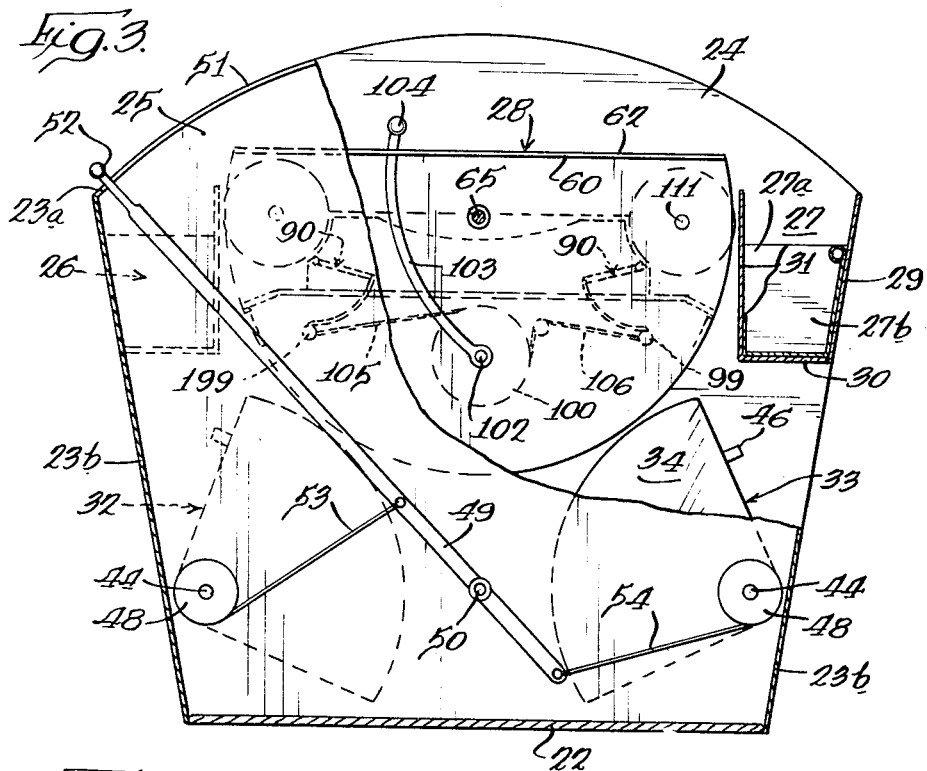
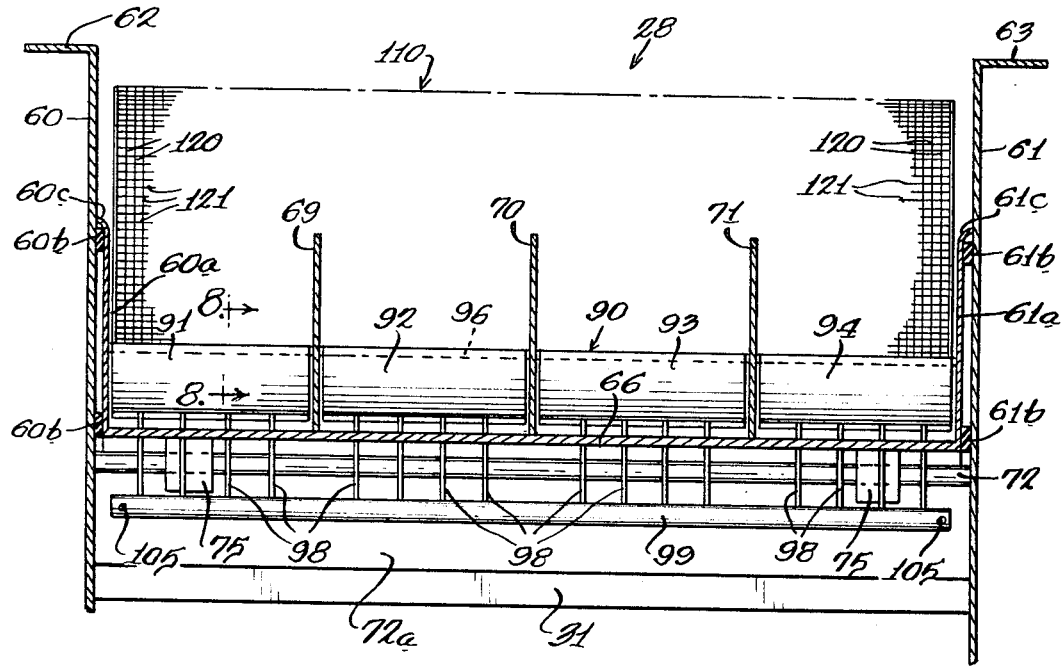

Aug. 6, 1968 — A. L. JACKSON — 3,395,795
TABLE SILVER ASSORTING MACHINE
Filed July 13, 1966 — 5 Sheets-Sheet 3
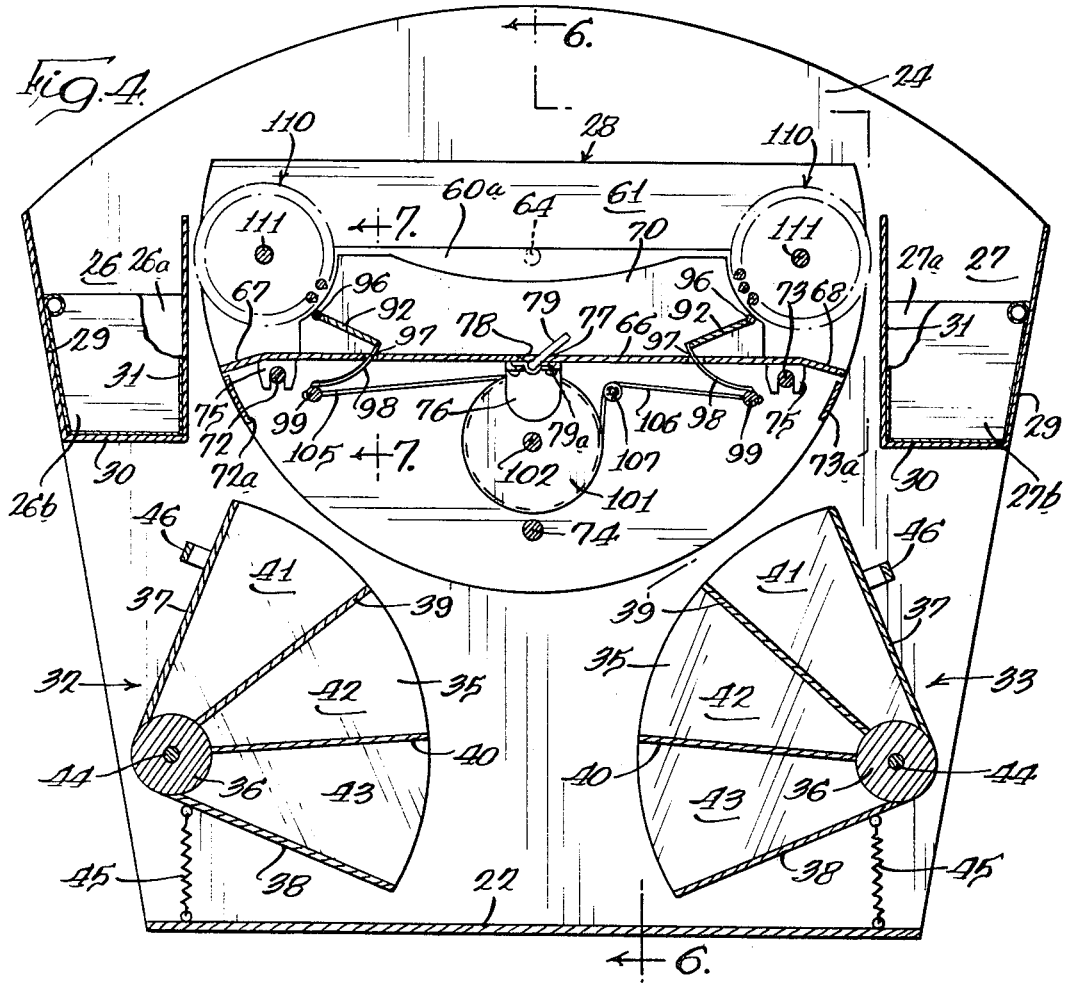
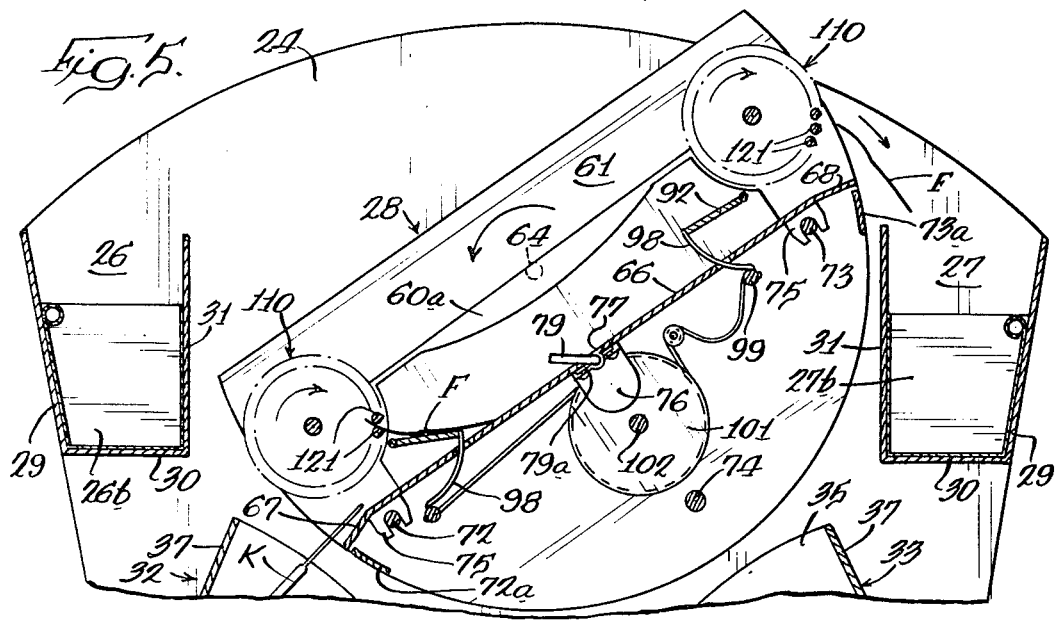

Aug. 6, 1968 A. L. JACKSON 3,395,795
TABLE SILVER ASSORTING MACHINE
Filed July 13, 1966 5 Sheets-Sheet 4
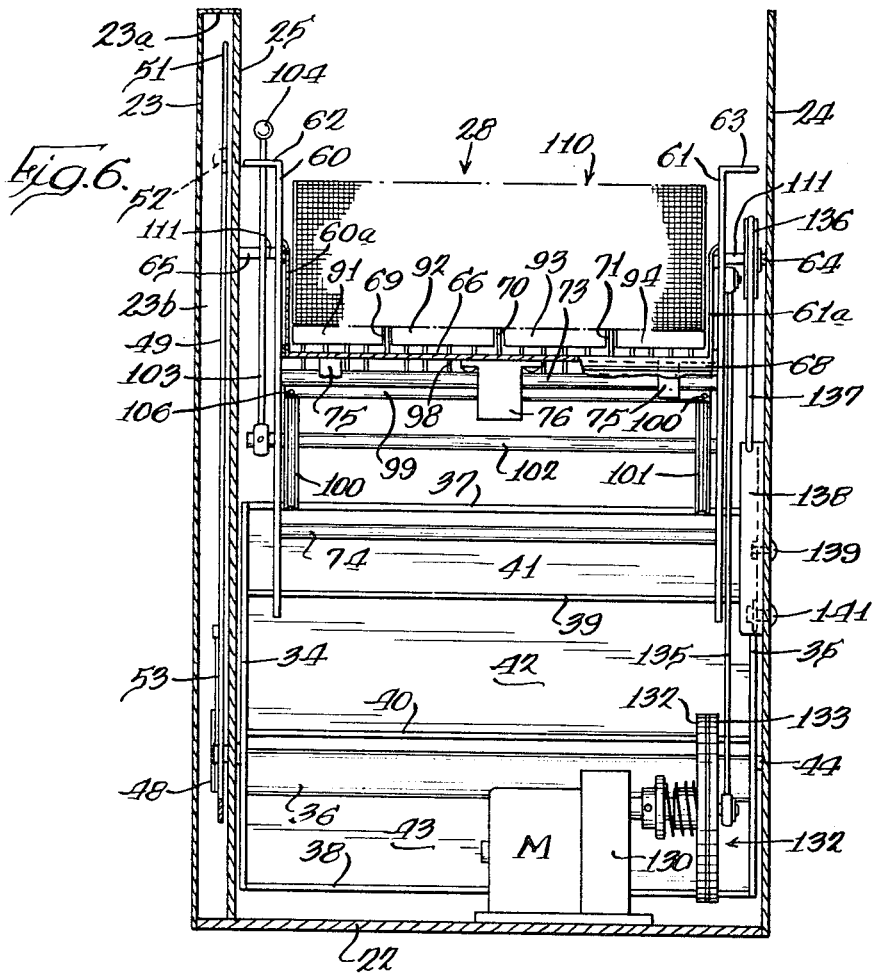
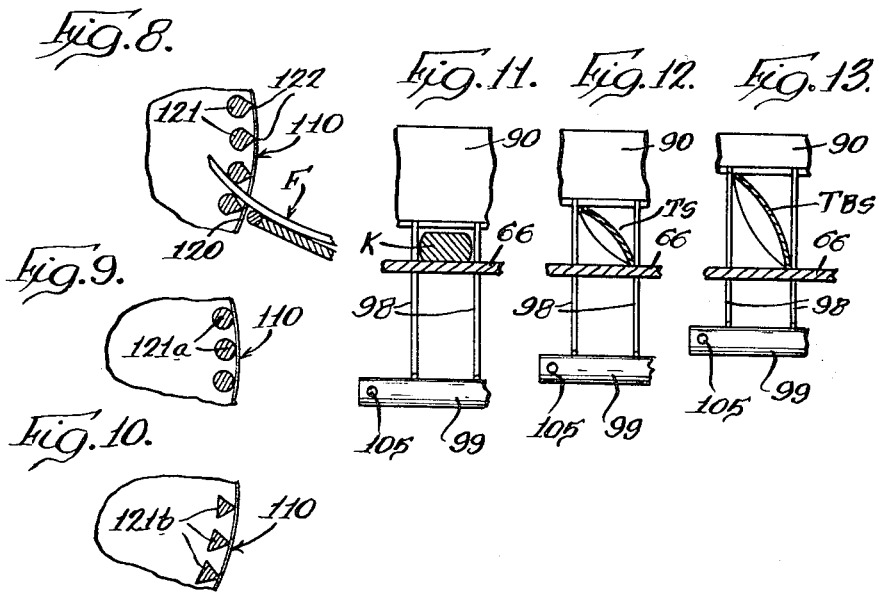

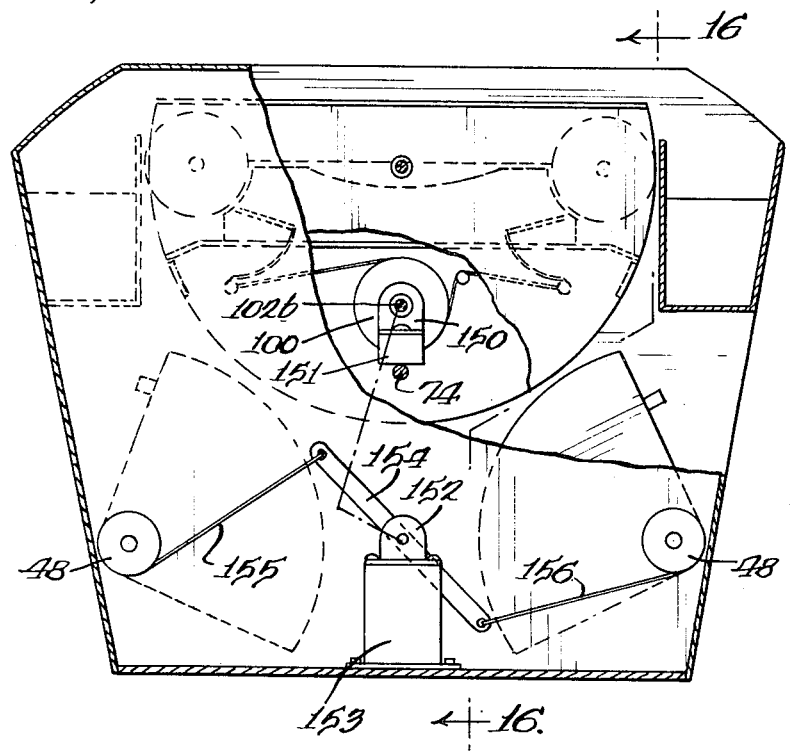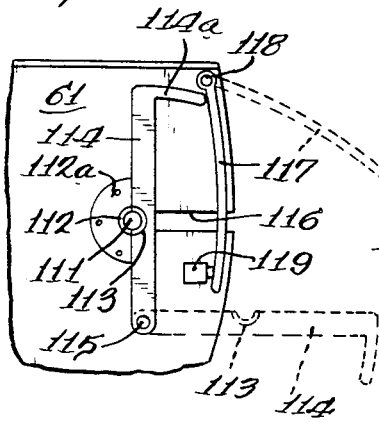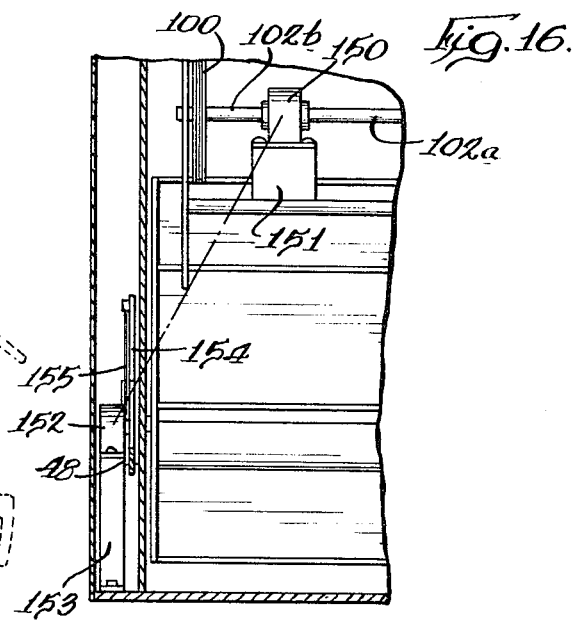

United States Patent Office 3,395,795
Patented Aug. 6, 1968

3,395,795
TABLE SILVER ASSORTING MACHINE
Aldrich L. Jackson, Eustis, Fla., assignor of one-third each to James C. Jackson, Pompano Beach, Fla., Conway A. Jackson, Tavares, Fla., and John H. Lindstrom, Greenwich, Conn.
Filed July 13, 1966, Ser. No. 564,791
16 Claims. (Cl. 209—74)

ABSTRACT OF THE DISCLOSURE

Silverware sorting apparatus including a frame and a silverware holding cradle assembly mounted on the frame for oscillating movement. The cradle assembly includes adjustable means at opposite ends thereof for selectively discharging pieces of silverware of different size and shape, and rotary drums are provided at said cradle assembly ends for picking up tined pieces of silverware. Storage bins are movably mounted on the frame adjacent the ends of the cradle assembly for receiving discharged pieces of silverware in different compartments of the storage bins.

---

This invention relates in general to sorting apparatus, and more particularly to apparatus for sorting a randomly arranged load of silverware to selectively discharge different pieces of silverware into storage areas.

In the operation of a restaurant or the like, where it is necessary to wash and handle a large quantity of silverware, there has been a long felt need for a machine which will automatically sort the different pieces of silverware into storage areas to obviate the necessity of having to sort the silverware manually. One solution that has been proposed for this problem is to provide two downwardly inclined adjacent rollers in a sorting machine, with one of the rollers being of uniform diameter, and the other of the rollers being stepped, thus providing openings of different size between the rollers through which different pieces of silverware can pass. The rollers are rotated in opposite directions to convey silverware longitudinally thereof, and to discharge the silverware through the openings therebetween. This arrangement has proved to be less than satisfactory, in that difficulty has been encountered in maintaining the silverware between the adjacent rollers. Also, with this arrangement, the selective discharge of different pieces of silverware depends to a large extent upon the curvature of the silverware, and slightly bent pieces of silverware may cause fouling of the machine. The openings in this type of machine are of fixed size, and cannot be adjusted. Such a machine also has a relatively high power consumption, and is large and bulky compared to the apparatus of the present invention. The abrasive effect upon silverware traveling the length of the machine is also objectionable. Additionally, such a machine is somewhat difficult to clean and maintain in a sanitary condition.

Accordingly, the general purpose of the present invention is to provide a new and improved silverware sorting machine which possesses none of the disadvantages of prior art devices, and which will function reliably to sort and discharge different pieces of silverware into selected areas.

An object of the invention is to provide a novel silverware sorting apparatus having a unique oscillatable cradle assembly for receiving randomly arranged silverware, with the cradle assembly having means for sorting and discharging different pieces of silverware into selected storage areas.

Another object of the invention is to provide a cradle assembly for silverware apparatus as described above, which is substantially perfectly balanced so as to minimize power requirements for oscillating the same.

A further object of the invention is to provide silverware sorting apparatus as described above, with rotatable pick-up drums at opposite ends of the oscillating cradle for picking up, transporting and discharging pronged silverware into storage compartments.

Still another object of the invention is to provide silverware sorting apparatus as described above with novel gate means adjacent opposite ends of the cradle assembly for selectively discharging different size pieces of silverware into suitable storage means.

A still further object of the invention is to provide novel movable silverware storage devices in combination with a sorting machine having an oscillatable cradle assembly.

Yet another object of the invention is to provide silverware sorting apparatus as described above with novel means for oscillating the cradle assembly and for rotating the pick-up drums.

These and other objects of the invention will hereinafter become more fully apparent from the following description taken in connection with the annexed drawings, wherein:

FIG. 1 is a front perspective view illustrating a preferred embodiment of the invention;

FIG. 2 is an enlarged sectional view looking generally along line 2—2 of FIG. 1;

FIG. 3 is an enlarged sectional view looking generally along line 3—3 of FIG. 1, with certain parts broken away for clarity of illustration;

FIG. 4 is an enlarged sectional view taken generally along line 4—4 of FIG. 1;

FIG. 5 is a fragmentary sectional view, similar to FIG. 4, and showing the cradle assembly in an inclined discharge and fork impaling position;

FIG. 6 is a sectional view taken generally along line 6—6 of FIG. 4;

FIG. 7 is an enlarged sectional view taken generally along line 7—7 of FIG. 4;

FIG. 8 is a sectional detailed view taken generally along line 8—8 of FIG. 7, and illustrating a portion of one form of rotary pick-up drum;

FIG. 9 is a view similar to FIG. 8 and showing a modification of the rotary pick-up drum;

FIG. 10 is a view similar to FIGS. 8 and 9, and showing a still further modification of the rotary pick-up drum;

FIG. 11 is a fragmentary, sectional detail view illustrating the adjustable gate means in a first position for discharging knives;

FIG. 12 is a view similar to FIG. 11, and illustrating the adjustable discharge gate means in a second position for discharging teaspoons;

FIG. 13 is a view similar to FIGS. 11 and 12, and showing the adjustable discharge gate means in a third position for discharging tablespoons;

FIG. 14 is a fragmentary detail view illustrating the mounting for one of the rotary pick-up drums;

FIG. 15 is a sectional view, similar to FIG. 3, and showing another embodiment of the invention; and FIG. 16 is a sectional view taken generally along line 16—16 of FIG. 15.

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

Referring now to the drawings, wherein like reference characters designate like or corresponding parts throughout the several views, the silverware sorting apparatus of the present invention is indicated in its entirety at 20 in FIG. 1, and includes a frame 21 having a base 22 adapted to rest upon a floor or the like, and upright front and rear walls 23 and 24. The sides of walls 23 and 24 diverge upwardly, and the upper ends thereof are arcuate. As is best seen in FIG. 6, a further wall 25 is provided immediately inwardly of wall 23, and extends between base 22 and inwardly extending portions 23a and 23b of wall 23. First and second storage compartments 26 and 27 are provided at opposite ends of the frame 21, and are positioned to receive pronged silverware from pick-up drums on an oscillatable cradle assembly 28 to be hereafter described.

Storage compartments 26 and 27 each include a slightly outwardly inclined outer wall 29, a horizontally disposed bottom 30, and a vertically disposed inner wall 31. Storage compartments 26 and 27 extend transversely across frame 21, as is best seen in FIG. 1, and the open upper ends thereof are positioned to freely receive forks from the pick-up drums on the cradle assembly 28, as will hereinafter be explained in detail.

Movable silverware storage bins 32 and 33 are secured to the frame 21 below the cradle assembly 28. Bins 32 and 33 are generally identically shaped, and each includes sector shaped end walls 34 and 35 converging toward a cylindrical hub 36. Bins 32 and 33 further include side walls 37 and 38 extending outwardly from hubs 36, and secured to end walls 34 and 35. Divider walls 39 and 40 extend generally radially outwardly of hub 36 and are secured between end walls 34 and 35 to divide the interior of bins 32 and 33 into three storage compartments 41–43. As will hereinafter become more fully apparent, storage compartments 41 are adapted to receive knives from the cradle assembly 28, while storage compartments 42 are adapted to receive teaspoons and storage compartments 43 are adapted to receive tablespoons. Shafts 44 extend through central openings in hubs 36, and are rotatably supported by bearings in frame walls 24 and 25, to mount the storage bins 32 and 33 for pivotal movement relative to the frame 21. Springs 45 are connected between the side walls 38 of the bins 32 and 33 and the frame base 22, to urge the bins toward the knife receiving position shown in FIG. 4. Handles 46 are provided on bin side walls 37 for manual manipulation of the bins, when desired.

Means are provided for moving the compartments 42 and 43 of bins 32 and 33 into a position for receiving teaspoons and tablespoons from the cradle assembly 28, and this means will be best understood from a consideration of FIGS. 3 and 6. As shown therein, pulleys 48 are fixed to the outer end of shafts 44, and are positioned between frame walls 23 and 25. An elongate actuating lever 49 is pivotally mounted to frame wall 25 at 50, and extends upwardly through a slot 51 in frame wall 23a. A manually engageable handle 52 is provided at the upper end of actuating lever 49, for pivotal movement of lever 49 about pivot 50. A first cable 53 is connected between the pulley 48 on bin 32 and a portion of lever 49 spaced above pivot 50, while a second cable 54 is connected between the pulley 48 on bin 33 and the end portion of lever 49 below pivot 50. Thus, by pivoting lever 49 in a clockwise direction about pivot 50, as viewed in FIG. 3, each of the bins 32 and 33 will be lifted to position the storage compartments 42 or 43 in the silverware receiving position. Suitable stop means, such as notches or the like, may be provided adjacent slot 51 for releasably latching lever 49 in an appropriate position to hold the bins 32 and 33 in the selected position.

The cradle assembly 28 will be best understood from a consideration of FIGS. 4–7. As is shown therein, cradle assembly 28 includes a pair of spaced side panels 60 and 61 having respective outturned upper ends 62 and 63. Side panels 60 and 61 are slightly larger than semi-circular, and the cradle assembly 28 is mounted for pivotal movement relative to the frame 21 by stub shafts 64 and 65 that extend outwardly from panels 60 and 61. Shafts 64 and 65 are at the center of the imaginary circle of panels 60 and 61, and the shafts are rotatably journalled in walls 24 and 25, respectively. Cradle assembly 28 includes a generally flat floor member 66 extending between side panels 60 and 61 below the pivot axis of the cradle assembly, and the outer ends 67 and 68 of floor 66 are inclined slightly downwardly. As is best seen in FIG. 7, a plurality of divider panels 69–71 extend upwardly perpendicularly from floor 66 at equally spaced positions thereacross, to thereby divide the cradle assembly into a plurality of longitudinally extending, parallel slideways. Thin, flexible side members 60a and 61a extend upwardly at opposite edges of floor 66, and spaced flexible pads 60b and 61b are provided on the outer surface of members 60a and 61a respectively, in engagement with respective panels 60 and 61. The upper ends 60c and 61c of members 60a and 61a are preferably inclined or curved outwardly into engagement with the adjacent panel.

A pair of aligned tie rods 72 and 73 extend between the panels 60 and 61 of cradle assembly 28, and a further tie rod 74 also extends between panels 60 and 61 adjacent the lower end of the cradle assembly. Skirts 72a and 73a extend between panels 60 and 61 outwardly of tie rods 72 and 73, and the upper ends of the skirts are spaced slightly from floor 66. Four rubber mounting feet 75 are secured to the undersurface of floor 66, and resiliently embrace tie rods 72 and 73 to resiliently mount the floor 66. A vibrator motor 76 is secured to the undersurface of floor 66 generally centrally thereof, and the vibrator assists in aligning silverware in parallel formation in the parallel slideways on the upper surface of the floor 66 and in moving the silverware therealong, as will hereafter appear.

The aligning of the silverware is also aided by a comblike flipper member 79 pivotally secured to floor 66 at the center thereof. Member 79 is preferably V-shaped, having a pair of spaced arms extending upwardly through V-shaped openings in the floor 66, and having the bight portion held against the undersurface of the floor by a bearing strap 79a. The sides 77 and 78 of the V-shaped openings provide stops to limit the pivoting movement of the member 79, and to maintain the member 79 at an upward angle even when the cradle is inclined. As will be more readily apparent from the ensuing description, when the cradle assembly 28 is pivoted into a discharge position the member 79 will pivot into the position shown in FIG. 5 and will comb silverware sliding along the floor 66 to loosen tangled silverware and direct the same in parallel array toward the discharge gate at the end of the cradle assembly.

The discharge gate means at each end of the cradle assembly 28 will be best understood from FIGS. 4–7 and 11–13. As is best seen in FIG. 7, a discharge gate means 90; including, a section 91 between panel 60 and divider 69, a section 92 between dividers 69 and 70, a section 93 between dividers 70 and 71, and a section 94 between panel 61 and divider 71; is pivotally mounted on the cradle assembly by a hinge pin 96 which extends through each of the divider panels 69–71 and terminates in walk 60a and 61a. Cradle floor 66 is provided with a plurality of spaced openings 97 (FIG. 4) therein, and arcuately shaped wire tines 98 are secured to the lower ends of the gate sections 91–94 and extend downwardly below the floor 66 through the openings 97. A weight, in the form of a transversely extending bar 99, is secured to the lower ends of tines 98. Weights 99 normally urge the discharge gate means 90 downwardly toward the floor 66 of the cradle assembly, but it will be understood that the gates 90 are able to pivot freely upwardly relative to the floor 66 about hinge pins 96, as will hereinafter become more fully apparent. The bottoms of the discharge gate sections 91–94, and the portions of tines 98 above the floor 66 cooperate with the floor 66 and the panels 60, 61 and 69–71 to define silverware discharge openings therebetween.

Means are provided for varying the size of the silverware discharge openings, and will be best understood by comparing FIGS. 3–6. As is shown therein, a pair of spaced reels 100 and 101 are carried by a shaft 102 that extends transversely across the cradle assembly, and which is pivotally mounted in side panels 60 and 61. A lever 103 is secured to the end of shaft 102 that extends outwardly of panel 60, and lever 103 extends upwardly through a slot in the outwardly extending portion 62 of panel 60, where it is provided with a manually engageable handle 104. A first pair of flexible cables 105 each have one end connected to one weight bar 99, and on opposite ends connected to reels 100 and 101; and a second pair of flexible cables 106 have one end secured to the other weight bar 99, and the other ends secured to reels 100 and 101. Cables 106 are trained over idlers 107 on panels 60 and 61, respectively. Thus, if lever 103 is pivoted in a clockwise direction, as viewed in FIG. 3, the cables 105 and 106 will be wound upon the reels 100 and 101, and the gates 90 will be elevated relative to the carriage floor 66. Suitable latch means, such as notches, may be provided in the panel portion 62 for selectively retaining the lever 103 in positions corresponding to the degrees of openings shown in FIGS. 11–13.

As is shown in FIG. 11, the gate 90 is positioned relatively closely to the cradle floor 66, so as to define a relatively narrow opening for discharging knives therebelow. In the position of FIG. 12, the gate 90 has been raised somewhat from the position of FIG. 11 to define a slightly larger opening, which will receive the bowl portion of a teaspoon therebetween. In the position of FIG. 13, the gate 99 has been adjusted to a position slightly higher than the position of FIG. 12, so as to receive the bowl portion of a tablespoon therebelow.

Rotary pick-up drums 110 are provided at opposite ends of the cradle assembly 28 for picking up, transporting and discharging forks into storage areas 26 and 27. Pickup drums 110 each include a central shaft 111 that is rotatably journalled in panels 60 and 61 by means which will be best understood from a consideration of FIG. 14, when panel 61 is illustrated. As is shown therein, a generally semicircular bearing half 112 is carried by a plate 112a that is fixed to panel 61, and a cooperating generally semicircular bearing half 113 is carried by an arm 114 which is pivotally mounted to panel 61 at 115. A generally horizontally disposed groove 116 is provided in panel 61, and slidably receives the end of shaft 111 therein. Thus, the drum 110 can be readily removed and cleaned, when desired. A locking arm 117 is pivotally mounted on panel 61 at 118, and is engageable with an extension 114a of arm 114 to retain the bearing 113 on arm 114 in the proper shaft supporting position. Arm 117 is preferably formed of metal, and a suitable magnet 119 is provided to retain the arms 117 in the full line locking position of FIG. 14. Arms 114 and 117 can be readily moved to the broken line position of FIG. 14 when it is desired to remove the pick-up drum.

Each pick-up drum 110 includes a plurality of spaced, circumferentially extending members 120, and a plurality of spaced horizontally extending members 121 that cooperate with members 120 to define a mesh-like structure. The circumferentially spaced members 120 are preferably spaced apart a sufficient amount to receive the prongs on a fork therebetween. This spacing obviously is small enough to reject the handles on spoons and knives, and spoon bowls. Members 120 and 121 are preferably formed of a suitable plastic material to minimize damage to the impaled fork prongs. In a preferred embodiment of the invention illustrated in FIG. 8, the members 121 are generally "tear-drop" shaped in cross section, to define a pointed leading edge 122 which facilitates entrance of the leading end of the fork prongs into the pick-up drum. The longitudinally extending members on the pick-up drums may also be circular or triangular in cross section, as is shown at 121a in FIG. 9, and at 121b in FIG. 10. Thus, as is evident from FIGS. 5 and 8, when the pick-up drums are rotated, the forks slide up the gate means 90 and the fork prongs impale the mesh-like pick-up drum. Means to be immediately hereafter described are provided for tilting the cradle assembly and for rotating the drums 110 to discharge forks into the storage areas 26 and 27.

As is best seen in FIGS. 2 and 6, the output shaft of a drive motor M is coupled through a suitable gear reduction unit 130 to the drive disc 131 of a friction clutch 132. The driven member 133 of friction clutch 132 is connected by a crank arm 135 to a portion of panel 61 off-set from the pivot axis defined by shaft 64. Thus, as the output member 133 of the friction clutch 132 is rotated by the motor M, the crank arm 135 will oscillate the cradle assembly 28 from a generally horizontally disposed loading position shown in FIG. 4, to a first inclined discharge position, such as that shown in FIG. 5, and then to a second discharge position, not shown, inclined oppositely from the position of FIG. 5. Pulleys 136 are fixed to the end of shafts 111 extending outwardly of panel 61. A cable 137 is trained over pulleys 136, and the ends thereof are connected to a lost motion link 138 pivotally connected to panel 61 at 139. A slot 140 in link 138 is impaled by a pin 141 on frame wall 24 to provide lost motion means in the drive to pulleys 136. Cable 137 includes a tensioning spring 143 therein to provide a proper amount of frictional engagement between cable 137 and pulleys 136, but it will be understood that the frictional engagement between the cable 137 and the pulleys 136 is light enough so that there can be some slippage in the drive. Thus, when the motor M is energized to initiate the oscillation of the cradle assembly 28, the link 138 will first be pivoted before the cable 137 positively drives pulleys 136 and the pick-up drums 110. When the pin 141 reaches the end of slot 140, the cable 137 will rotate the pick-up drums 110. When the steepest inclined, or discharge position (FIG. 5) is reached, and the cradle assembly begins to move back toward the position of FIG. 4, the pick-up drums 110 will not be immediately rotated because of the last motion means. This prevents silver articles, other than forks, from being frictionally lifted by the drums 110.

After a supply of silverware has been washed, it is loaded into the cradle assembly 28 with the cradle assembly being positioned as shown in FIG. 4. The silverware will, of course, be randomly arranged and supported on the floor 66 of the cradle assembly. Suitable electrical circuit means, not shown, are provided for energizing the main drive motor M and the vibrating motor 76. When this has been done, the vibrating motor 76 will shake the floor 66 on its resilient mounting, and the crank assembly 135 will begin to oscillate the cradle assembly back and forth between the discharge positions. The divider panels 69–71 and the comb 79 will function to align the sliding and vibrating silverware in parallel formation. When the cradle assembly 28 is tilted to the position of FIG. 5, the upper or right hand pick-up drum 110 will be rotated to discharge forks. The lost motion means provided by link 138 will prevent the drums 110 from rotating as movement toward the opposite discharge position begins, and forks sliding down floor 66 will slide up the gate means 90 and the prongs thereof will impale the lowermost pick-up drum. Assuming that the gate means 90 is in the position of FIG. 11, knives will be discharged from the cradle assembly 28 into the compartment 41 of the left-hand bin 32 at the same time that forks are impaling the lowermost pick-up drum 110. As the cradle assembly continues to pivot from the position of FIG. 5 toward the oppositely inclined position, the cable 137 will pivot the left hand drum 110 in a counterclockwise direction to transport impaled forks and discharge them into the storage compartment 26.

At the same time, inertia will swing the left-hand weight bar 99 upwardly to lift the associated gate means 90, and free any articles of silverware held thereunder. When the cradle assembly 28 again pivots back toward the position of FIG. 5, the right hand gate means 90 will be swung upwardly by inertia forces to free silverware trapped thereunder, and the left hand gate means 90 will move back into the preselected position for discharging knives, so that only knives sliding down the cradle floor 66 will be discharged from the cradle assembly. This operation is continued until all of the knives loaded on the cradle assembly have been sorted and discharged into the compartments 41 of the storage bins 32 and 33; and all of forks in the silverware load have been impaled, transported and discharged by drums 110 into compartments 26 and 27.

After all of the knives and forks have been discharged, the lever 103 is manipulated by handle 104 to position the gate means 90 as shown in FIG. 12 for discharging teaspoons from the cradle assembly 28. Additionally, the lever 49 is manipulated by handle 52 to position the compartments 42 in the storage bins 32 and 33 in a silverware receiving portion to receive the teaspoons being discharged from the cradle assembly 28. The cradle assembly 28 is then oscillated for an amount of time to sort and discharge the teaspoons from the silverware remaining upon the cradle assembly 28.

After all of the teaspoons have been discharged from the cradle assembly, the gate means 90 are again adjusted by manipulating the lever 103 to locate the gate means in the position shown in FIG. 13. Likewise, the storage bins 32 and 33 are moved by manipulating the lever 49 to locate the compartments 43 therein in the silverware receiving position to receive the tablespoons being discharged from the cradle assembly.

After all of the silverware has been sorted and discharged from the cradle assembly 28, the motors M and 76 are deenergized to stop the oscillation of the cradle assembly and the vibration of the cradle floor 66. The forks may be easily removed from the compartments 26 and 27, and the knives and spoons may also be conveniently removed from the storage bins 32 and 33.

A slightly modified version of the sorting machine is shown in FIGS. 15 and 16, and in this embodiment, automatic means are provided for adjusting the level of the gate means 90 and for positioning the bins 32 and 33. For this purpose, a reversible motor 150 is mounted on tie rod 74 by a support 151, and motor 150 has oppositely extending drive shafts 102a and 102b connected to pulleys 100 and 101 for rotation thereof. Thus, the motor 150 is substituted for the lever 103, and functions to automatically position the discharge gate 90. A further reversible motor 152 is carried by a support 153 that is mounted on the base 22 of the frame structure, and the output shaft motor 152 rotates a lever 154 having cables 155 and 156 secured to opposite ends of the lever and to pulleys 48. Thus, motor 152 takes the place of lever 49, and functions to automatically move the storage bins 32 and 33. Suitable electrical control means are provided to synchronize motors 150 and 152 and to correlate the positioning of the discharge gate means 90 with the positioning of the storage bins 32 and 33. A suitable timer, not shown, of the adjustable type and having manual start and stop buttons, is preferably provided in the control circuit, so that variable time periods can be selected for sorting loads of silverware which have an above-average number of particular pieces of silverware.

From the foregoing, it will be readily appreciated that an extremely versatile silverware sorting machine has been provided, which will function reliably and consistently to sort and distribute different articles of silverware.

The substantially perfectly balanced cradle assembly will discharge silverware therefrom by gravity action, with only a small amount of power being required to oscillate the cradle assembly. The vibrating floor 66 of the cradle assembly assists the sliding action of the silverware as the cradle assembly is tilted, and tends to urge a maximum number of silver article ends toward contact with the drums 110 and the gate means 90. The vibratory action also tends to shake the knives toward the floor for favorable discharge attitude, while also assisting greatly in shaking the spoons through the openings in the gate means 90. The skirts 72a and 73a effectively prevent forks discharged from the pick-up drums from passing between the cradle assembly and the compartments 26 and 27. Divider panels 26a and 27a may be provided in compartments 26 and 27, respectively, in the same plane as the divider panels 69–71 on floor 66 to receive forks from the slideways therebetween. Suitable removable liners, such as those shown at 26b and 27b may be provided in the compartments 26 and 27 between the dividers 26a and 27a. In a like manner, dividers and removable liners may be provided in the compartments 41–43 of storage bins 32 and 33. Thus, each of the objects of the invention have been fully achieved.

I claim:

1. Silverware sorting apparatus comprising: a frame; a cradle having parallel side walls with a floor extending therebetween adapted to receive randomly arranged silverware thereon; a plurality of spaced generally parallel panels extending upwardly from said floor between said side walls and dividing said cradle into a plurality of parallel channels; means mounting said cradle for oscillating movement between a loading position wherein said floor is generally horizontally disposed, and first and second discharge positions wherein said floor is inclined in opposite directions; discharge gates pivotally mounted between said cradle side walls, one discharge gate being provided adjacent each end of said cradle floor; a plurality of tines secured to each discharge gate, said tines each extending below said floor through openings therein; a weight secured to the tines of each discharge gate and urging the discharge gates downwardly toward the cradle floor, the bottom of said discharge gates and adjacent tines cooperating with said floor to define silverware outlet openings therebetween; each of said discharge gates being freely movable upwardly away from said cradle floor to release pieces of silverware held thereunder; means for adjusting said discharge gates relative to said floor to vary the size of said openings for selectively discharging from said cradle pieces of silverware of differing cross sectional size and shape; first and second storage bins pivotally mounted on said frame below said cradle, each bin being positioned to receive silverware from the discharge openings at one end of said cradle, each bin having a plurality of compartments therein for receiving a different type of silverware and each compartment being selectively movable to a silverware receiving position; rotary pick-up drums, one rotatably mounted adjacent each end of said cradle between the side walls thereof, said pick-up drums having means thereon for picking up, transporting and discharging pronged silverware; a pair of compartments on said frame, each compartment being spaced outwardly from one end of said cradle and positioned to receive pronged silverware from one of said pick-up drums; and means for oscillating said cradle and for rotating said pick-up drums including, a drive motor, crank means connected between said drive motor and said cradle for oscillating the same, and cable means connected to said pick-up drums for rotating the drums as the cradle oscillates.

2. Silverware sorting apparatus as set forth in claim 1 in which said cradle includes means supporting said floor resiliently relative to said side walls, and wherein means are provided for vibrating said floor.

3. Silverware sorting apparatus as set forth in claim 1 in which said means for moving said gates relative to said floor includes at least one reel pivotally mounted on a cradle side wall, cables connected between said reel and the weights of said discharge gates, and means for pivoting said reel.

4. Silverware sorting apparatus as set forth in claim 3 wherein said means for pivoting said reel includes first motor means.

5. Silverware sorting apparatus as set forth in claim 4 wherein second motor means, synchronized with said first motor means, is provided for moving said storage bins to selectively position the compartments of said storage bins in the silverware receiving position in timed relation with the changing of the size of the silverware outlet openings.

6. Silverware sorting apparatus comprising: a frame; a cradle mounted for oscillating movement on said frame, said cradle having a floor adapted to receive silverware thereon; discharge gates, one adjacent each end of said cradle floor; means for adjusting said discharge gates relative to said floor to provide orifice means of variable size for selectively discharging different pieces of silverware from said cradle; hopper means on said frame positioned to receive silverware from said orifice means; rotary pick-up drums, one adjacent each end of said carriage, said pick-up drums having means thereon for picking up, holding and discharging pronged silverware; compartment means on said frame positioned to receive pronged silverware from said pick-up drums; means for oscillating said cradle; and means for rotating said pick-up drums.

7. Silverware sorting apparatus as set forth in claim 6 wherein said means on said pick-up drums includes a plurality of spaced first members extending longitudinally of each drum, and a plurality of spaced second members extending circumferentially around each drum and co-operating with said first members to define a mesh-like structure.

8. Silverware sorting apparatus as set forth in claim 7 wherein the leading edges of said first members converge.

9. Silverware sorting apparatus as set forth in claim 6 in which said hopper means includes first and second storage bins each mounted on said frame adjacent one end of said cradle and each having means dividing the interior thereof into a plurality of compartments for reception of different pieces of silverware, and wherein means are provided for selectively moving each of said compartments into a silverware receiving position.

10. Silverware sorting apparatus as set forth in claim 6 wherein said discharge gates are defined by gate members pivotally mounted on said cradle above said floor, the lower ends of said members being spaced from said floor to define said orifice means therebetween.

11. Silverware sorting apparatus as set forth in claim 10 wherein weight means urge said gate members toward said floor, and said adjusting means is defined by means for moving said gate members upwardly relative to said floor.

12. Silverware sorting apparatus comprising: holding means for receiving randomly arranged silverware; means associated with said holding means for arranging said silverware in generally parallel formation including means dividing said holding means into parallel channels, and means for vibrating said holding means; means for oscillating said holding means; means at opposite ends of the holding means responsive to the cross-sectional size and shape of said silverware for selectively discharging pieces of silverware of different size and shape from said opposite ends of the holding means; and storage means for receiving discharged pieces of silverware from said holding means.

13. Silverware sorting apparatus comprising: holding means for receiving randomly arranged silverware; means for oscillating said holding means between oppositely inclined positions to slide said silverware therealong; means for vibrating said holding means; means responsive to the cross-sectional size and shape of said silverware for selectively discharging pieces of silverware of different size and shape from said holding means; and storage means for receiving discharged pieces of silverware from said holding means.

14. Silverware sorting apparatus as defined in claim 13 in which rotary pick-up drums are provided on said holding means, said pick-up drums having means thereon adapted to be impaled by forks sliding down said holding means, and wherein means are provided for rotating said pick-up drums in response to oscillation of said holding means.

15. Silverware sorting apparatus as defined in claim 14 wherein said means for rotating said pick-up drums includes lost motion means for preventing the rotation of said pick-up drums when said holding means is in the inclined positions.

16. Silverware sorting apparatus comprising: holding means for receiving randomly arranged silverware; means for oscillating said holding means between oppositely inclined positions to slide said silverware therealong; means on said holding means at opposite ends thereof responsive to the cross-sectional size and shape of said silverware for selectively discharging pieces of silverware of different size and shape from said opposite ends of the holding means; and storage means for receiving discharged pieces of silverware from said holding means.

References Cited

UNITED STATES PATENTS

| | | | |
|---|---|---|---|
| 1,888,520 | 11/1932 | Twomley | 221—188 X |
| 2,549,316 | 4/1951 | Kremer et al. | 209—97 |
| 3,301,397 | 1/1967 | Stutz | 209—73 |

ALLEN N. KNOWLES, *Primary Examiner*.